Figure 1:
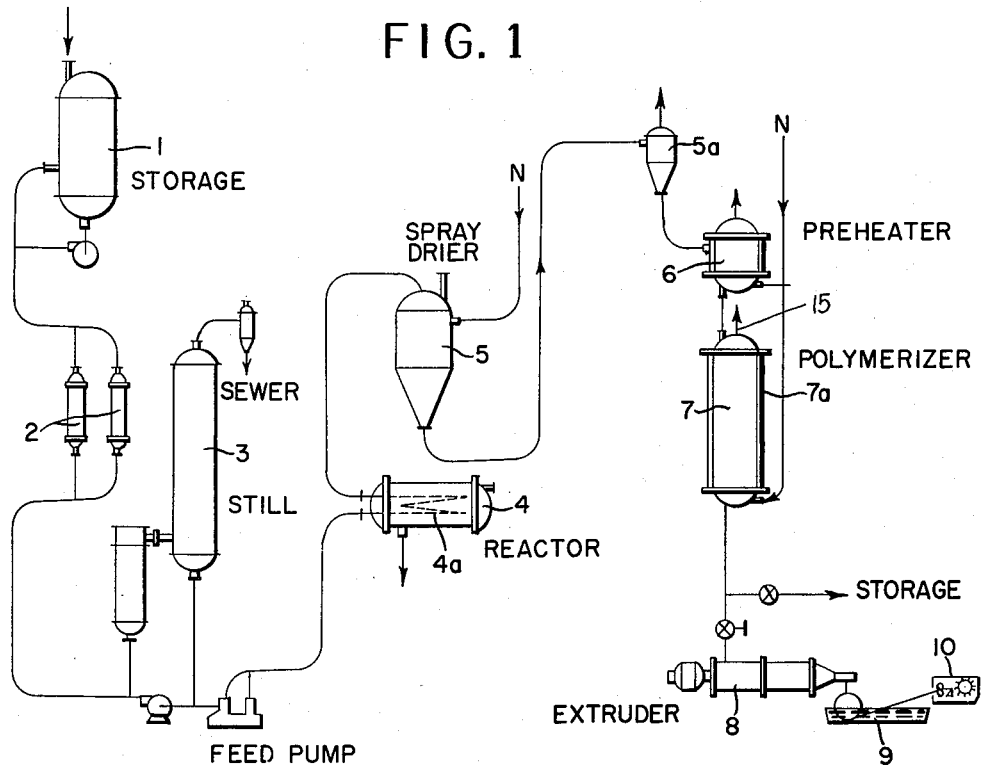
Figure 2:
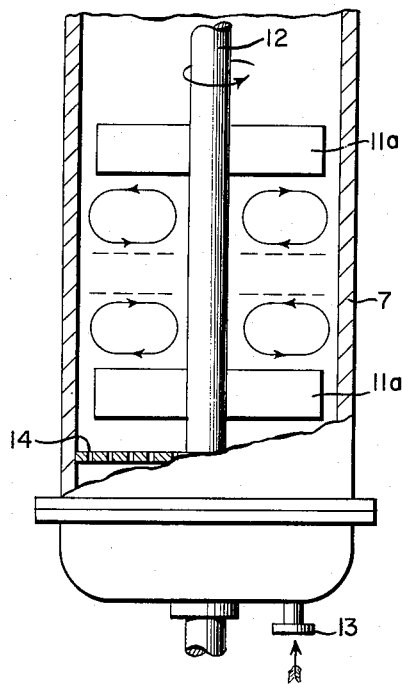
Figure 3:
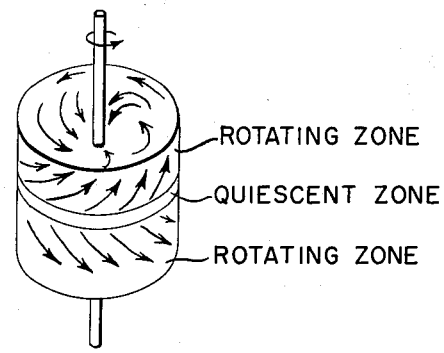

April 24, 1962  G. C. MONROE, JR  3,031,433
SOLID PHASE POLYMERIZATION OF POLYAMIDES
Filed April 18, 1958  2 Sheets-Sheet 1

*INVENTOR*
GEORGE C. MONROE, JR.

BY

ATTORNEY

April 24, 1962 G. C. MONROE, JR 3,031,433
SOLID PHASE POLYMERIZATION OF POLYAMIDES
Filed April 18, 1958 2 Sheets-Sheet 2

INVENTOR
GEORGE C. MONROE, JR.

BY

ATTORNEY

United States Patent Office 3,031,433
Patented Apr. 24, 1962

3,031,433
SOLID PHASE POLYMERIZATION OF POLYAMIDES
George Clarke Monroe, Jr., Orange, Tex., assignor to E. I. du Pont de Nemours and Company, Wilmington, Del., a corporation of Delaware
Filed Apr. 18, 1958, Ser. No. 729,305
4 Claims. (Cl. 260—78)

This invention relates to the treatment of solids and more particularly to conducting chemical reactions in a solid phase in which a subdivided chemical is treated in a quasi fluid state.

Solids of many kinds have been treated in subdivided form for the purpose of drying by the removal of free and combined water, for the purpose of chemically cracking high molecular weight compounds to produce compounds of lower molecular weight, for the purpose of conducting solid phase chemical reactions, and for related purposes. Solid phase reactions have been carried out, particularly in the plastic industry, for the treatment of compounds in which substantially linear polymers are produced by condensation. In the latter processes polyesters and related compounds are formed. In U.S. Patent 2,172,374 of Paul J. Flory, issued September 12, 1939, non-fiber forming polyamides are heated and transformed in the solid phase from low molecular weight polymers to higher molecular weight polymers. In the chemical industry, pulverized coal is cracked for the preparation of alkanes and alkenes and reacted with steam and oxygen to produce synthesis gases including carbon monoxide and hydrogen. In the petroleum industry, particulate catalysts are used in so-called fluidized beds wherein chemical reactions are effected by contact of petroleum vapors with the surface of the solid catalysts.

Because of the inherent nature of chemical reactions, fairly strict attention is given to the proximity of the reactants to insure rapid reactions. Solid phase reactions have not generally been favored for chemical (non-fissionable) synthesis, for in this phase reaction rates are relatively slow and uneconomical. Moreover, the tendency of solids to form plastic, or soft particles that stick together under reaction temperatures has contributed to the avoidance of the solid phase for many chemical reactions.

An object of the present invention is to provide an improved process for the treatment of solids in particulate form and in a quasi fluid state. Another object is to provide a method of conducting solid phase reactions wherein a condensable chemical compound in the solid phase is subdivided and thereafter subjected to condensation polymerization. Yet another object is to solid phase polymerize, in a fluidized state, a carbonamide such as a prepolymerized diamine-dicarboxylic acid condensation product. Other objects and advantages of the invention will hereinafter appear.

Certain aspects of the invention are broadly applicable to solid phase treatment of many different kinds of compounds. These aspects are concerned with the methods employed for the maintenance of a fluidized state in which the particulate solid is treated in a special chamber provided with a plurality of fluidization zones in each of which a partial or fractional treatment of the solid particles is effected in contact with a fluid. In a more limited aspect the invention is directed to the solid phase polymerization of prepolymerized polycarbonamides to convert them to higher molecular weight linear polymers, and in a still more limited aspect the invention is directed to the treatment of a diamine-dicarboxylic acid from its salt formation through its prepolymerization and its final solid phase polymerization in a fluidized state to a linear high molecular weight polymer whereby a polymer is produced having superior properties for use as a molding powder composition in the plastic arts.

As a starting material, in a specific embodiment, there is formed, in accord with known processes of the art, a polyamide salt such, for example, as the salt obtained from the condensation of adipic acid with hexamethylene diamine in an aqueous solution. The salt after decolorization and filtration, is introduced into a still for the removal of part of the solution water. The partially dehydrated solution is pressurized to between 500 and 2,000 p.s.i. and subjected to a reaction at a temperature between about 200° C. and 325° C., preferably between about 250° C. and 300° C., wherein the salt is partially condensed. The effluent from this partial condensation reaction is sprayed into a hot stream of an oxygen-free inert gas; water flashes off as a vapor giving prepolymerized polyamide in the form of an essentially dry powder. The powdered prepolymer, after separation from water vapor present and the inert gas, may, if desired, be preheated. During the preheating of the powder to substantially final polymerization temperature, some further condensation takes place. The powder is next, with or without preheating, introduced into a powder polymerization tower, more fully described hereinafter, in which the molecular weight of the polymer is increased to the desired extent. The powder discharged from the tower may be sent to storage or, contrariwise, fed directly into and through an extruder in which the powder is melted, the melt extruded as a ribbon or other suitable form and the ribbon cut up into any desired form for ultimate use.

The invention will be more readily understood by reference to the drawing (in which like parts are designated by like numbers throughout). FIGURE I illustrates, diagrammatically and in partial cut-away portions, apparatus in which the process of the invention is conducted; FIGURE II illustrates, in diagrammatical form and in partial cut-away portions of the apparatus, the physical action that takes place within a powder-treating tower shown in FIGURE I; and FIGURE III illustrates, in perspective, the general paths taken by suspended particles within a single cell.

In FIGURE I, storage vessel 1 contains a salt—of a dibasic acid and a diamine, of an amino-carboxylic acid, of a dihydroxy-dicarboxylic acid condensate or of an equivalent thereof, which is passed through fixed bed filters 2, containing activated carbon granules or other suitable filter material for removing color from the salt. The filtered salt is then passed into concentrating still 3, for removal of a portion of the free water present and the thus concentrated salt solution passed into a reactor 4, wherein the salt is partially condensed or polymerized. From reactor 4 the prepolymer is injected into spray drier 5, wherein a sufficient temperature is maintained to flash off the water contained in the polymer, and to precipitate the polymer in the form of a powder. A substantial portion of the latent heat required for flashing off water from the prepolymer comes from the sensible heat of the solution injected into the spray drier 5, and the remainder by the passage of a heated, deoxidized inert gas such as nitrogen into the spray drier 5. The powder, after separation of the drying medium of the spray drier 5a, is heated in preheater 6 to substantially the temperature at which the subsequent polymerization is conducted. The thus preheated powder is then passed into a powder polymerization tower 7, wherein the powder is polymerized, in a plurality of successive steps, from the molecular weight of the preheated prepolymer to the desired molecular weight of the product polymer. From the tower 7, the powder may be sent directly to storage or melted in extruder 8, of the customary type, extruded therefrom as a ribbon or strip, and the shape after cooling in water bath 9, cut into the desired form by a cube cutter or similar device 10.

The apparatus, described diagrammatically in FIGURE I, is used for polymerizing nylon salt by forming a prepolymer therefrom and raising the molecular weight of prepolymerized polyamide by a continuous process (in contrast to a batch process). The salt is continuously drawn from storage, decolorized, filtered, and then concentrated in still 3. The salt introduced into the still is quite dilute containing up to about 50% water. In the still the water content is reduced to 35% or lower, preferably to 25% or lower. This concentrated salt solution is passed through reactor 4, which is a continuous tube reactor maintained at a temperature between 250° C. and 300° C. In this reactor polymerization is further advanced at a pressure between 500 and 2,000 p.s.i. Reactor 4 is jacketed by a heating fluid and contains a tube coil 4a; in this tube the viscosity of the polymer is increased to a relative viscosity of about 2.8–4.0 in a period of from 10 to 15 minutes. Due to the condensation that takes place within the tube, water of condensation will be present in the polymer, as it leaves reactor 4, together with the free water content of the polymer that was introduced with the concentrated salt solution into the reactor.

The resulting prepolymerized polyamide in aqueous solution is then sprayed, atomized, or dispersed in any other suitable manner, into drier 5 and meets therein an atmosphere of deoxidized nitrogen maintained at a temperature above 100° C. to flash off the water. The prepolymer solidifies as a powder that is conveyed from the base of the drier 5 by the deoxidized nitrogen stream to a separator 5a where the prepolymer powder is separated from the gas stream.

The particles of substantially dry polymer are then preheated up to polymerization temperatures in preheater 6. The preheated prepolymer is then introduced into the polymerization tower 7 in which it is solid phase polymerized in a number of steps. The polymerization tower 7 is provided with a jacket 7a, in one or more sections, through which suitable heat transfer fluids are passed in order to maintain the desired temperatures within the polymerization tower 7. The polymer may be introduced into tower 7 in any suitable particulate size as a powder, particle, or pellet, etc. up to 5 to 10 mm. in diameter or more.

FIGURE II illustrates diagrammatically and in more detail the construction of the polymerization tower 7. The tower, of circular cross-section, is provided with a series of cells or sections each containing a number of agitators 11 mounted on and rotating with a vertical shaft 12 which is concentric with the tower. The agitator paddles 11a are preferably not pitched (that is, their faces are parallel to the axis of shaft 12 so that their motion imparts substantially no net vertical component of motion, either upward or downward, to the contents of the tower 7. Clearance between the tips of the paddles 11a and the wall of the tower 7 is preferably the minimum practicable.

A tower so adapted and arranged can be used for drying solids, polymerizing prepolymerized compounds, conducting solid phase reactions, catalyzing reactions in which the catalyst is held for an appreciable time in each section and gradually allowed to pass from one section to the other from the top to the bottom of the tower as the treatment progresses from the maximum treatment at the top to the minimum treatment in the bottom section for catalytic reactions and vice versa for solid phase reactions, drying operations, etc.

For treatment of many solids and especially for the treatment of prepolymerized polyamides to increase their molecular weight, solid phase condensation should be conducted outside the range at which the powder is in a plastic state, i.e., becomes soft enough that particles tend to agglomerate by sticking to one another. The plastic state of polyamides is usually about 40° C. below the melting point of the polymer. The polymerization, accordingly, is preferably conducted at a temperature slightly below such temperatures. In the tower of the invention, increased bed density close to the plastic state can be maintained in the sections because of the low upward gas flow.

The process described in the drawings was operated by continuously passing an aqueous solution containing 50% by weight of a salt from hexamethylene diamine and adipic acid from storage tank 1 through the fixed bed filter 2 and concentrator 3 wherein the water content was removed by distillation down to about 25%. The resulting aqueous salt solution was passed through reactor 4 wherein the salt was partially polymerized. The product from reactor 4 issued as a 60% polyamide–40% water mixture which was forced under pressure and as a fine spray into spray drier 5. In said drier the partially polymerized polyamide spray met heated oxygen-free nitrogen at a temperature of about 100° C. which flashed off the water present. The polyamide, as a substantially dry powder having a relative viscosity of about 3.5, was separated from the nitrogen and water vapor and then introduced into the top of tower 7 at the rate of about 22 lbs./hours.

Into the tower 7 oxygen-free nitrogen was introduced at a rate of about 0.01 cu ft./sec., measured at 200° C. From the tower the highly polymerized product issued with a relative viscosity of about 25. This polymer was then melted in extruder 8, extruded as a strip, cooled in strip cooler 9, cut in cube cutter 10 and then packaged.

By reference to FIGURE II, it will be noted that the motion of individual particles in the vicinity of each agitator 11, shown by the ovals that define the path of individual particles, is: outward along, and from the tips of, the rotating paddles 11a, then up or down along the wall of the tower 7, then back inward toward the shaft 12 and thence again to the periphery of the paddles 11a by centrifugal force. With the proper adjustment of paddle size, agitator speed and spacing along the shaft, and upward gas velocity, it is possible to minimize intermixing of particles between the zones of agitation around adjacent agitators, to the extent that a relatively quiescent interface exists between adjacent zones of agitation. As powder is added to the top of the tower and withdrawn at an equal rate from the bottom, the individual particles move downward by being transferred from one zone of agitation to the next lower zone through these relatively quiescent interfaces. There is little of the top-to-bottom mixing or short-circuiting of particles from inlet to outlet which is characteristic of fluidized beds where fluidization is achieved by upward gas velocity alone. Nor are individual particles held up in the tower for very long times, as is characteristic of gas-fluidized beds. The overall movement of powder through the tower thus approximates "first in-first out" flow.

FIGURE III illustrates in perspective the general flow of particles within the cell and the zones in each. The arrows follow the paths taken by the particles. Moreover, within each zone of agitation, the individual particles are subjected to sufficient turbulence, by virtue of the motion imparted to them by the paddles, to achieve good heat transfer with the gas and with the walls of the tower. Heat transfer coefficients equal to or higher than those achieved in a system fluidized by gas velocity alone are obtained. Nitrogen or other inert gas is passed upward into tower 7 from pipe 13, through perforated distribution plate 14, and is discharged from the tower through pipe 15. The amount and upward velocity of gas passed through the tower are adjusted to suspend or fluidize the powder in the gas in the tower. The upward gas velocity necessary for fluidization of powder in the agitated tower is a small fraction (about 10 percent) of the gas velocity required for equivalent fluidization in the absence of agitation.

It has been found that the rate of solid phase polymerization is greatly influenced by the molecular weight of the starting prepolymer and to an extent that has remarkable commercial significance, for example, at 216° C. the relation between starting molecular weight and time required to reach the molecular weight of about 15,000 is shown in this table:

Table

| $\bar{M}_n$ | R.V. | Hours To Reach $\bar{M}_n$ 15,000— (R.V.57) |
|---|---|---|
| 1,000 | 3.5 | 16 |
| 2,500 | 5.5 | 4 |
| 4,000 | 8.5 | 2 |

$\bar{M}_n$, as described herein, is determined by the method as defined by Flory "Principles of Polymer Chemistry," Cornell, 1953, p. 273.
R.V.=relative viscosity.

Inasmuch as the time required to produce the prepolymer is relatively short when compared with the time required for solid phase polymerization in tower 7, appreciable reduction in the amount of polymer held up in the process and in the size and cost of the processing equipment is realized. Moreover, the extent of any degradative reactions is minimized by the short hold-up time with the result that polycarbonamides produced by the process of this invention are substantially free from components that reduce the utility of the resin.

Examples of specific polycarbonamides that may be treated in the practice of the invention are those having this repeating group in the polymer chain:

specific examples of which are polytetramethylene sebacamide, polypentamethylene adipamide, polypentamethylene sebacamide, polyhexamethylene adipamide, polyhexamethylene suberamide, polyoctamethylene adipamide, polydecamethylene carbamide, polymerized 9-aminononanoic acid, polymerized 11-aminoundecanoic acid; while the invention is principally directed to the treatment of such polymers in the solid state without modifiers, modifiers may likewise be present, such as, for example, plasticizers, resins, pigments, dyes, antioxidants, etc. The invention is likewise applicable to mixing two or more polycarbonamides or copolymers thereof that have been polymerized to a moderate degree by heating such a mixture to a high molecular weight, low moisture content polymer.

The products of the invention are especially adapted for extrusion from the molten state through a die to give fabricated parts. In addition, the polymers have superior properties due to their high molecular weight and can be fabricated in blow-molds to produce vases, bottles, globes, and related shapes. The polymers are also suitable for use in pressure-molding devices wherein a preformed shape is placed between plates that have been provided with milled cavities; the preformed shape is placed in the mold and heat and pressure applied to mold the polymer to the shape of the cavity. The polymers are also suitable for use as fibers, film, etc.

The relative viscosity described in the specification and claims of this application is determined by measurements taken in any suitable viscosimeter on a formic acid solution at a concentration of 8.4 weight percent of polymer in 90% formic acid as 25° C.

I claim:
1. The polymerization process of producing a polycarbonamide polymer having a molecular weight of greater than about 15,000 from a polycarbonamide polymer having a molecular weight greater than about 1000 but less than about 15,000, which comprises: continuously introducing at a first point said polycarbonamide polymer having a molecular weight of greater than about 1000 but less than about 15,000 in the form of particles having a diameter of up to about 10 mm. into a stream of oxygen-free gas heated to a temperature at least about 40° C. below the melting point of said polycarbonamide; agitating said stream containing said particles at a plurality of predetermined zones, said zones being spaced sufficiently far apart that relatively quiescent regions exist between the predetermined zones, the velocity of the oxygen-free gas stream and the quantity of agitation being so selected that the particles form a fluidized bed; continuously withdrawing polycarbonamide polymer particles having a molecular weight greater than about 15,000 from said stream at a second point separated from first point by said predetermined zones.

2. The process of claim 1 in which the velocity of the oxygen-free gas is insufficient to form a fluidized bed of the particles, and in which the particles form a fluidized bed by the combined action of gas velocity and agitation.

3. The process of claim 1 in which the heated oxygen-free gas is nitrogen.

4. The process of claim 1 in which the polycarbonamide polymer introduced into said stream of oxygen-free gas is the condensation product of a diamine and a dicarboxylic acid.

References Cited in the file of this patent
UNITED STATES PATENTS
2,783,187    Odell _____ Feb. 26, 1957